Oct. 7, 1958

C. E. WIGGINS 2,854,949

GRAVITY FEEDER

Filed June 14, 1957

C. E. Wiggins
INVENTOR

BY *CA Snow & Co.*

ATTORNEYS.

United States Patent Office 2,854,949
Patented Oct. 7, 1958

2,854,949
GRAVITY FEEDER

Clyde E. Wiggins, Winter Garden, Fla., assignor of one-half to E. R. Gertner, Orlando, Fla.

Application June 14, 1957, Serial No. 665,711

2 Claims. (Cl. 119—53)

This invention relates to a gravity feeder, and more particularly to a chicken feed hopper wherein the feed is adapted to fall by gravity to a trough to which the chickens have access.

A primary object of this invention is the provision of an improved feed hopper of this nature provided with a built-in trough as an integral unit of the hopper which is accessible to the chickens and refilled from the hopper as the food is eaten.

A further object of the invention is the provision of a device of this character in which the trough, by virtue of its arrangement relative to the hopper is relatively simple to keep clean, as well as effect even keeping dust or trash out of the feed.

A further very important object of this invention is the provision of a blade mounted on top of the hopper adapted for opening the paper feed bags, whereby the bag may be opened on the hopper itself, and the contents dumped therein from the bag, without the necessity of separately opening the bag, and then lifting it over the hopper and emptying the grain therein.

A further object of the invention is the provision of such a hopper which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter, and disclosed in the accompanying drawings wherein there is shown a preferred embodiment of this inventive concept.

In the drawings:

Figure 5 is a sectional view taken substantially along the line 5—5 of Figures 2 and 3 as viewed in the direction indicated by the arrows.

Figure 6 is an enlarged fragmentary detail sectional view taken substantially along the line 6—6 of Figure 5 as viewed in the direction indicated by the arrows.

Figure 7 is an enlarged fragmentary detail sectional view taken substantially along the line 7—7 of Figure 2 as viewed in the direction indicated by the arrows.

Similar reference characters refer to similar parts throughout the several views of the drawings.

Figure 1:
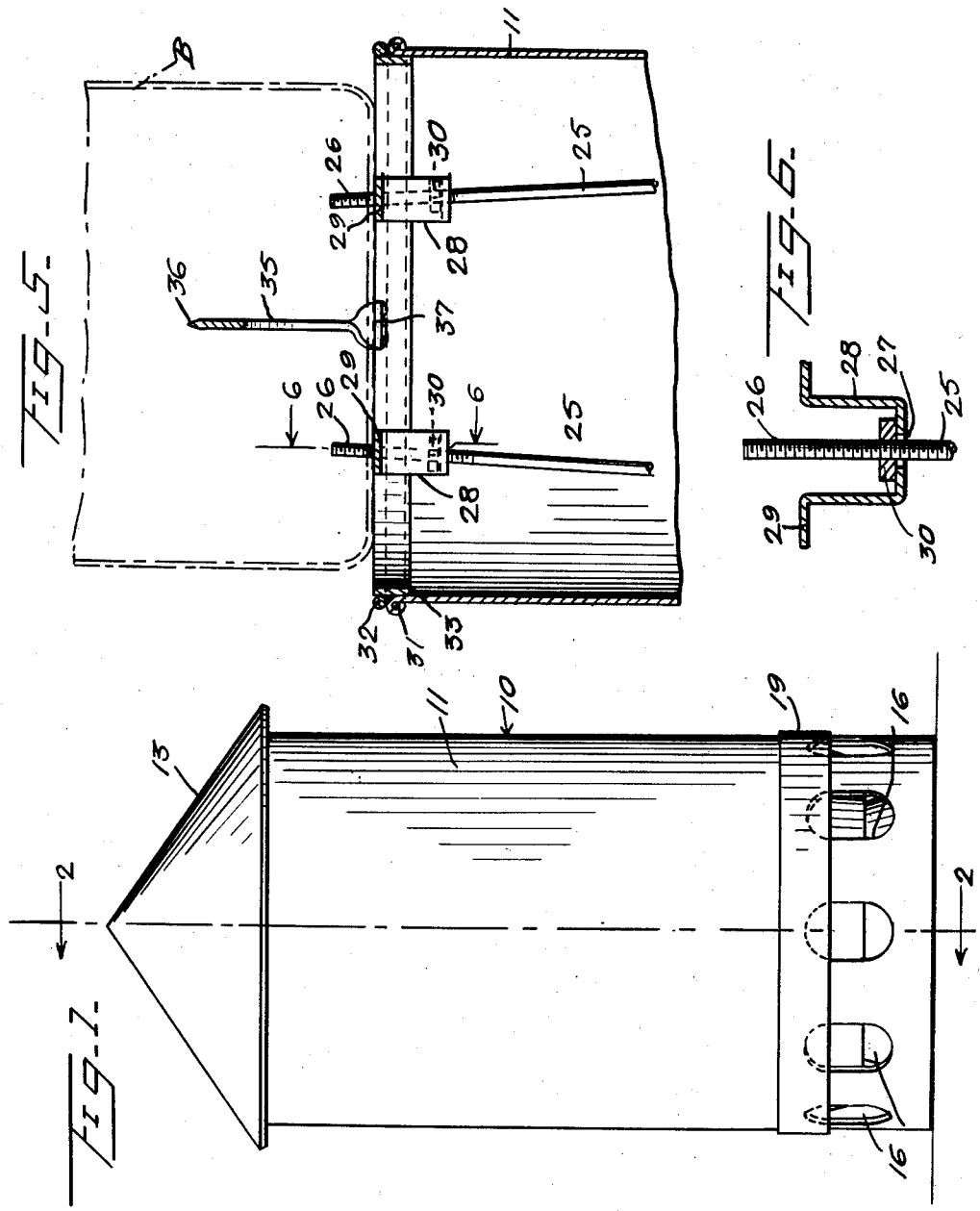
Figure 1 is a side elevational view of one form of device embodying features of the instant invention.
Figure 2:
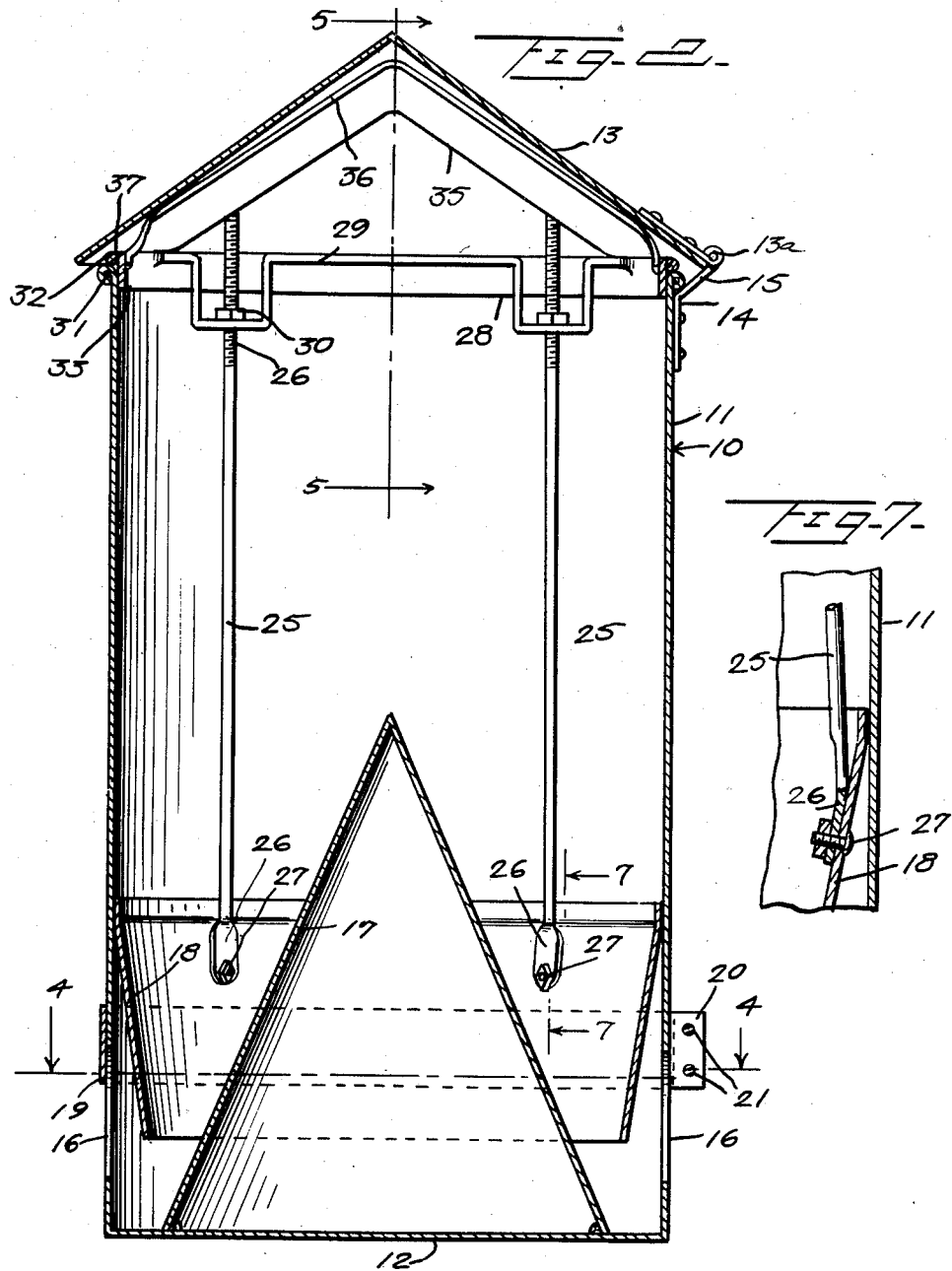
Figure 2 is an enlarged sectional view taken substantially along the line 2—2 of Figure 1 as viewed in the direction indicated by the arrows.
Figure 3:
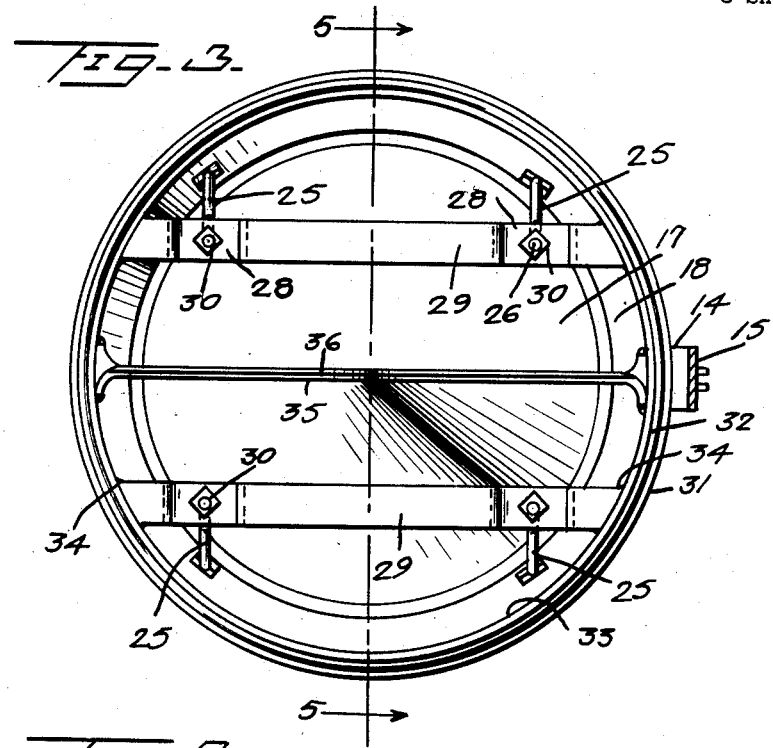
Figure 3 is a top plan view of the device with the cover removed.
Figure 4:
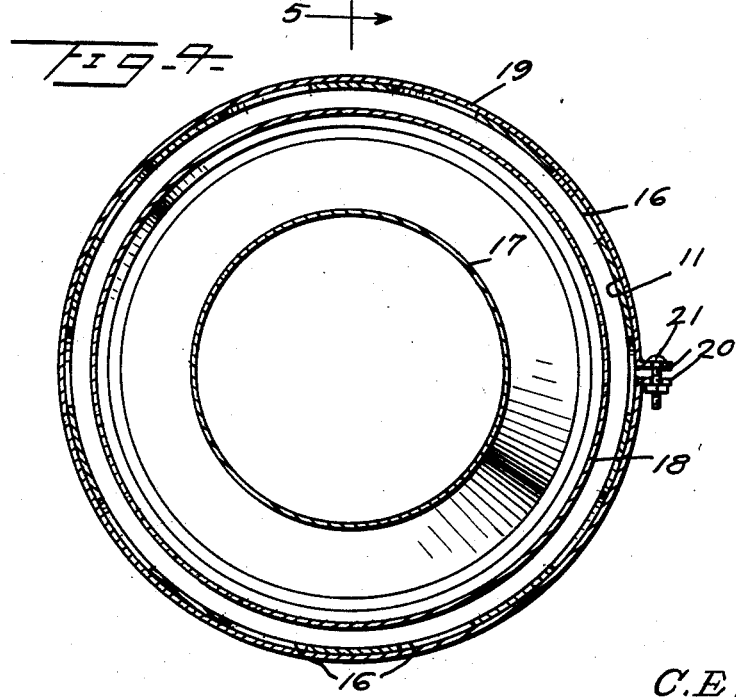
Figure 4 is a sectional view taken substantially along the line 4—4 of Figure 2 as viewed in the direction indicated by the arrows.

Having reference now to the drawings in detail, the device of the instant invention comprises a hopper or container generally indicated at 10, which includes a tubular side wall 11, and a bottom plate 12. The hopper is provided with a conical top 13, which is secured to the side wall 11 as by means of a conventional hinge construction 13, including a lug 14 secured to the top of side wall 11 and including an offset portion 15. The lid or cover 13 is of slightly greater diameter than the hopper 10, and is adapted to extend outwardly about the periphery of the top thereof, as best shown in Figures 1 and 2.

The lower portion of the cylindrical or tubular wall 11 is provided with a plurality of equidistantly spaced cut-outs or apertures 16, the lower portions of which are rounded, to permit access to the interior of the hopper by fowls such as chickens or the like to reach the feed which is normally contained in the hopper. A conical deflector member 17 is centrally positioned on the bottom wall 12, as best seen in Figure 2 for the purpose of directing the feed to the sides of the device adjacent the openings 16.

An internal deflector or baffle of inverted frusto conical configuration, as indicated at 18 is positioned interiorly of the hopper 10 and extends downwardly about the conical member 17 to a point near the bottom 12, spaced therefrom, in order to deflect the feed or grain from the hopper out of the corners formed by the juncture of the side wall 11 and the bottom 12, in order that all feed may be available to the fowl when their heads are inserted in the opening 16.

A circumferential band 19 extends about the outer periphery of wall 11 at a point adjacent the opening 16, and is provided with juxtaposed outstanding lugs 20, which are releasably clamped together by means of bolts 21, the arrangement being such that upon loosening of the bolts 21 the band 19 may be moved upwardly or downwardly on the wall 11 to vary the size of the openings 16, as may be desired.

Means are provided for varying the relative position of the member 18 interiorly of the hopper, and take the form of vertical rods 25, having flat lower ends 26, secured as by bolts and nuts 27 to suitably spaced points about the internal periphery of member 18. The upper portions of rods 25 are threaded as indicated at 26 and pass through suitable apertures 27 in inverted saddles 28 formed in transverse cross bars 29 extending across the top of the hopper or receptacle 10. Lock nuts 30 are engaged with the threaded ends 26, for the purpose of adjusting the effective lengths of the rods 25, to vary the relative positioning of the member 18 within the hopper 10.

The top rim of circular wall 11 is reverted as indicated at 31, to provide a bead upon which seats a circular ring 32, which has secured thereto a vertical circular flange 33, which extends interiorly of the side wall 11.

The flange 33 is suitably secured as by welding or the like to ring 32, which in turn is similarly secured to the bead 31. The extremities of cross bars 29 are also suitably secured as by welding 34 to the flange 33.

A bag opening blade 35 comprises a V-shaped strip of metal, having its outer end sharpened as at 36, and extending upwardly above the ring 32, and conforms in contour to the internal configuration of a cross section taken through conical lid 13. The ends of blade 35 are twisted as at 37, to form flat surfaces, which are suitably secured as by welding or the like to the ring 32.

From the foregoing the use and operation of the device should now be readily understandable. The inverted frusto conical member 18 is first suitably adjusted relative to the bottom 12 by rotation of the nuts 30 which varies the effective length of the rods 25, and the band 19 is then suitably positioned by releasing the bolt and nut assemblies 21 to adjust the size of the aperture 16 to the desired extent, the bolts and nuts 21 then being retightened to hold the band 19 in adjusted position. The lid 13, being swung open about its hinge 13a, the blade 35 and its sharpened edge 36 projects upwardly above the top of the hopper or container 10, as shown best in Figure 5. A suitable feed bag B is then impaled on the apex of the blade, the sharpened edge 36 serving to sever the full width of the bottom of the bag, whereupon the feed or other contents of the bag fall by gravity into the hopper. Conical member 17, and member 18 serve to restrict the flow of feed, and limit the quantity available to the fowls through the opening 16.

The empty bag may then be thrown away, or if the bag is of a size so that its contents exceed the capacity of the hopper or bin 10 it may be reclosed for storage and subsequent use.

By virtue of this invention it will be seen that the necessity of the separate opening of the feed bag and subsequent carrying of the bag to the hopper for refilling is obviated, and that in a single operation the bag may be opened and the hopper immediately filled, thus saving time and labor on the part of the user.

It will also be seen that there is herein provided an improved gravity feeder for fowls or the like, which accomplishes all of the objects of this invention including many advantages of great practical utility and commercial importance.

As many embodiments may be made of this inventive concept, and as many modifications may be made in the embodiment herein before shown and described, it is to be understood that all matter herein is to be interpreted merely as illustrative, and not in a limiting sense.

What is claimed is:

1. In a device of the character described, in combination, a cylindrical hopper having a bottom wall and a plurality of radial feeding openings about the lower edge thereof, a conical deflector projecting upwardly from said bottom wall interiorly of the hopper, an inverted frusto conical baffle in said hopper surrounding said deflector, means for varying the vertical position of said baffle relative to said hopper, a conical lid for said hopper, and a triangular bag opening blade extending across the top of said hopper over said baffle interiorly of said lid, whereby a bag may be inverted in said hopper over said deflector and opened by said blade upon impact to permit grain to pass over said deflector in said hopper.

2. In a device of the character described, in combination, a cylindrical hopper having a bottom wall and a plurality of radial feeding openings about the lower edge thereof, a conical deflector projecting upwardly from said bottom wall interiorly of the hopper, an inverted frusto conical baffle in said hopper surrounding said deflector, means for varying the vertical position of said baffle relative to said hopper, a conical lid for said hopper, a bag opening blade extending across the top of said hopper interiorly of said lid, said blade being of inverted V-shaped configuration and extending upwardly to a point above the rim of said hopper adjacent the apex of said lid, over said baffle whereby a bag may be inverted in said hopper over said deflector and opened by said blade upon impact to permit grain to pass over said deflector in said hopper.

References Cited in the file of this patent

UNITED STATES PATENTS

| | | |
|---|---|---|
| 1,167,385 | Clough | Jan. 11, 1916 |
| 2,593,879 | Harry | Apr. 22, 1952 |
| 2,602,420 | Peterson | July 8, 1952 |

FOREIGN PATENTS

| | | |
|---|---|---|
| 17,925 | Great Britain | Oct. 28, 1893 |